United States Patent [19]

Hamaki

[11] Patent Number: 5,745,487
[45] Date of Patent: Apr. 28, 1998

[54] COMMUNICATION APPARATUS FOR TRANSMITTING/RECEIVING DIFFERENT TYPES OF DATA IN ONE TDM SLOT

[75] Inventor: Takayuki Hamaki, Hirakata, Japan

[73] Assignee: Matsushita Electric Industrial Co., Ltd., Kadoma, Japan

[21] Appl. No.: 749,096

[22] Filed: Nov. 14, 1996

[30] Foreign Application Priority Data

Nov. 16, 1995 [JP] Japan .................... 7-298012

[51] Int. Cl.⁶ ........................................ H04J 3/02
[52] U.S. Cl. ................ 370/352; 370/458; 370/465; 370/442
[58] Field of Search .................... 370/347, 352, 370/353, 354, 355, 356, 431, 433, 434, 435, 437, 442, 458, 464, 465, 468, 477, 498, 535, 252, 522; 379/90.01, 93.01, 93.09, 93.11, 100.15, 100.16, 100.17

[56] References Cited

U.S. PATENT DOCUMENTS

| | | |
|---|---|---|
| 4,763,321 | 8/1988 | Calvignac et al. .............. 370/352 |
| 5,392,280 | 2/1995 | Zheng .......................... 370/353 |
| 5,428,613 | 6/1995 | Spiotta et al. . |
| 5,444,770 | 8/1995 | Davis et al. . |
| 5,463,616 | 10/1995 | Kruse et al. . |

*Primary Examiner*—Wellington Chin
*Assistant Examiner*—Huy D. Vu
*Attorney, Agent, or Firm*—Price, Gess & Ubell

[57] ABSTRACT

A communication apparatus is provided for transmitting and receiving a plurality types of data with a TDM slot, changing the type of the data by switching a mode. The communication apparatus includes mode switching unit 101 and data dividing unit 102. The mode switching unit 101 judges whether a length of the second data is less than a predetermined value when it detects a necessity for transmitting the second data during a transmission of the first data. If less, mode switching unit 101 inserts a non-acknowledgement-type mode switch directive in the time slot data and transmits the time slot data by an interrupt. The data dividing unit 102 identifies the second data included in the received time slot data if it is judged that the received time slot data includes the non-acknowledgement-type mode switch directive, and processes the data according to the identification.

6 Claims, 9 Drawing Sheets

COMMUNICATION APPARATUS FOR TRANSMITTING/RECEIVING DIFFERENT TYPES OF DATA IN ONE TDM SLOT

BACKGROUND OF THE INVENTION (1) Field of the Invention

This invention relates to a TDMA communication apparatus, specifically to an apparatus for making communications by effectively changing the type of data included in one TDM slot.

(2) Description of the Prior Art

In Personal Access Communications System (PACS), which is one of Personal Communications System (PCS) in the United States, Time Division Multiple Access/Frequency Division Duplex (TDMA/FDD) is adopted as a digital transfer control method for the digital wireless communication devices used in the system.

In TDMA with multiplex level "n," uplink and downlink frames are alternately transmitted and received in repetition. Each frame is made up of n time slots. A pair of an uplink time slot and a downlink time slot are assigned to one communications connection. Accordingly, n communications can be made independently and simultaneously in the TDMA method with multiplex level "n."

For the sake of conveniences, it is defined that "one time slot" is a time period at each stage, "one TDM slot" a series of time slots repeated at certain intervals, that is, a sequence of the same time slots in a frame.

Recently, a communication includes various types of data. Accordingly, one TDM slot including different types of data is frequently transferred and received (hereinafter, such communications are called "mixed data communications").

The following is a description of conventional mixed data communications in PACS.

Figure 1:
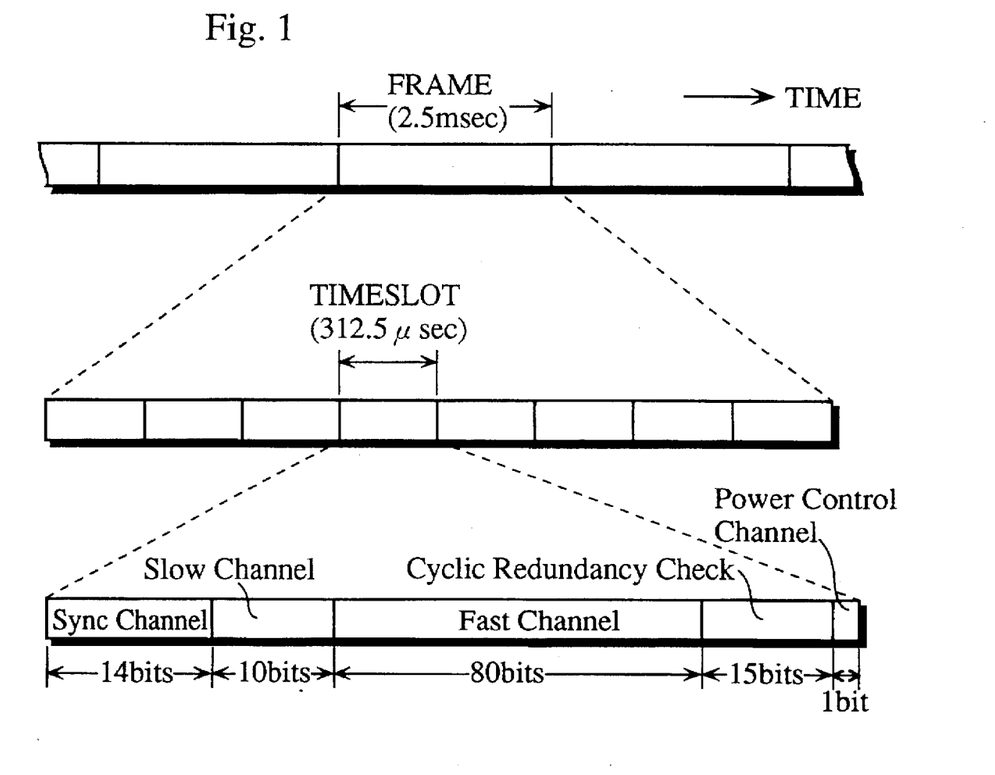
FIG. 1 shows the construction of a downlink frame in both the present invention and a conventional communication apparatus.

FIG. 1 shows the construction of a downlink frame in PACS.

In PACS, the multiplex level for TDMA is 8. Each downlink frame consists of eight time slots. It is defined that each time slot has 312.5 μsec, each frame 2.5 msec.

One time slot in a downlink frame includes a plurality of channels, namely, a 14-bit Sync Channel, a 10-bit Slow Channel, an 80-bit Fast Channel, a 15-bit Cyclic Redundancy Check (CRC), and a 1-bit Power Control Channel (PCC). The construction of an uplink frame in PACS is almost the same as that of a downlink frame. One time slot in an uplink frame includes a 12-bit Guard Time, a 2-bit Differential Encoding Reference Symbol, a 10-bit Slow Channel, an 80-bit Fast Channel, a 15-bit CRC, and one reserved bit.

Note that, in the following description, "time slot data" indicates all of the above types of data included in a time slot either of an uplink frame or a downlink frame and that substantial "data" is included in the Fast Channel.

Figure 2:
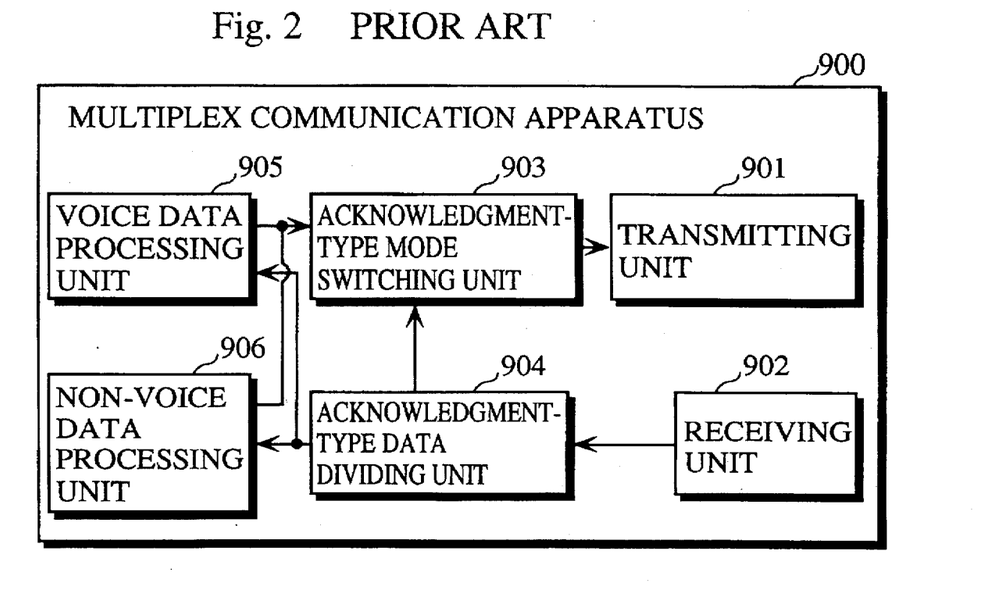
FIG. 2 is a block diagram illustrating the construction of a conventional communication apparatus.

FIG. 2 is a block diagram showing the construction of a conventional communication apparatus.

Communication apparatus 900 includes transmitting unit 901 for transmitting the time slot data onto a digital communication line with time division, receiving unit 902 for receiving the time slot data from the digital communication line and separating the received time slot data with time division multiplexing, acknowledgement-type mode switching unit 903 for changing the acknowledgement-type mode used in the data transmission, acknowledgement-type data dividing unit 904 for dividing the data into voice data and non-voice data according to the received mode, voice data processing unit 905 including a microphone, a speaker, a voice CODEC, etc, for processing voice data, and non-voice data processing unit 906 including a microprocessor, a data buffer, a modem, etc, for processing non-voice data.

Note that a mode can be set independently for each of the transmitting direction and receiving direction. Here, the mode indicates a logical communication state used to identify the type of data (e.g., voice or non-voice) currently transmitted or received. For this communication, the primary and secondary modes are used.

Figure 3:
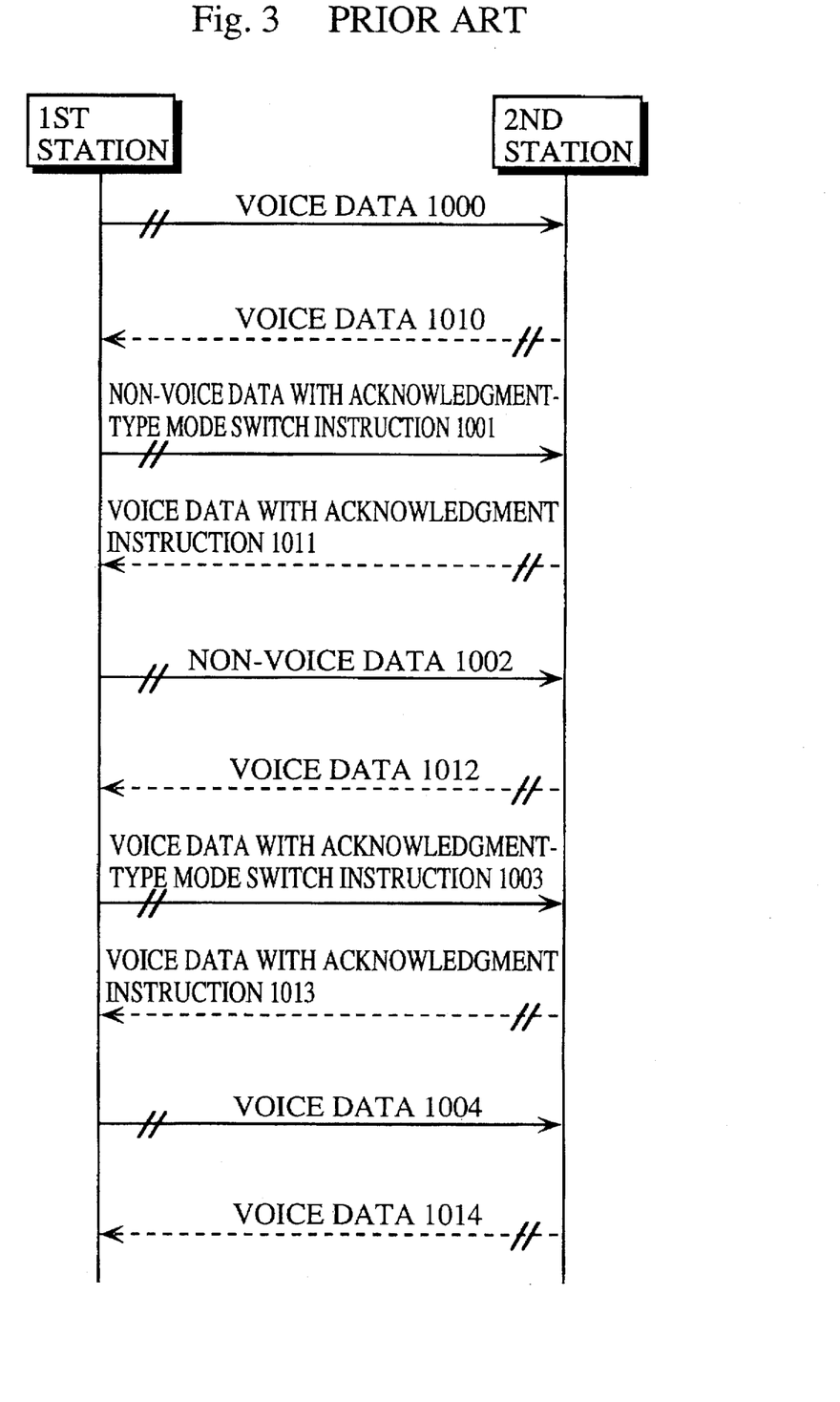
FIG. 3 shows a sequence of the mixed data communications by conventional communication apparatuses.

FIG. 3 shows a sequence of the mixed data communications dealing with voice data and non-voice data between the first station and the second station, which each are communication apparatus 900 shown in FIG. 2.

In the sequence of the mixed data communications of FIG. 3, the first station transmits voice data to the second station, stops the transmission temporarily, transmits non-voice data, and re-transmits voice data after having transmitted the non-voice data.

It is supposed that a connection is established in the originating connection before the data is transmitted so that the voice data is transmitted in the primary mode and non-voice data in the secondary mode. Note that the solid lines in FIG. 3 indicate data flow from the first station to the second station, the dotted lines data flow from the second station to the first station, and the dual line successive data transmission.

Figure 4:
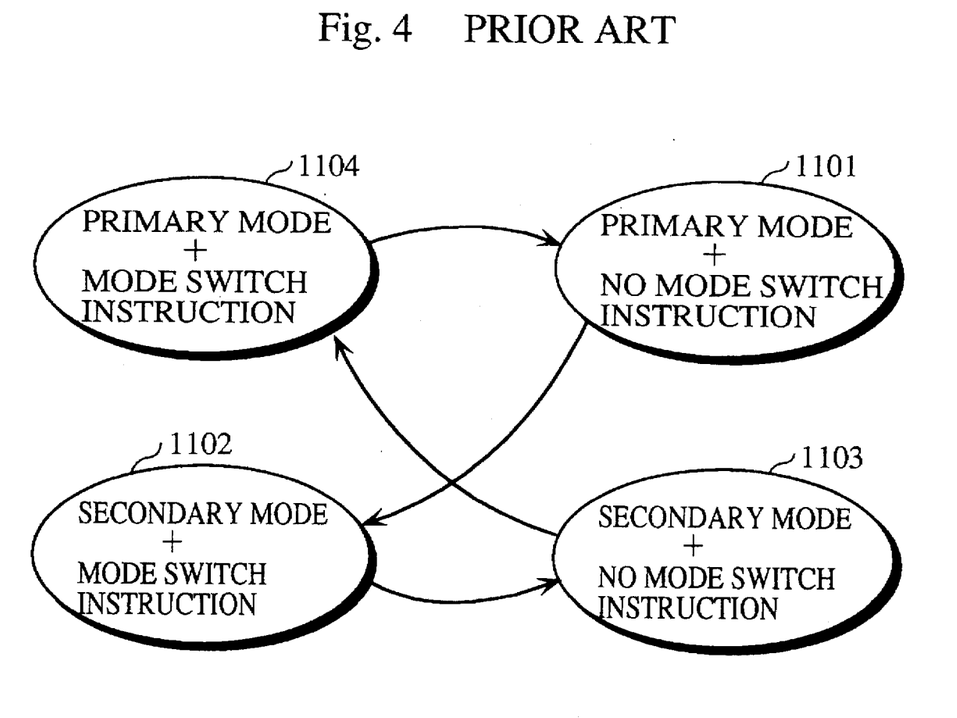
FIG. 4 is a diagram of states of a conventional communication apparatus.

FIG. 4 is a diagram of states of the first station in the sequence of the mixed data communications of FIG. 3.

The states shown in FIG. 4 are combinations of whether a mode switch directive is set in Slow Channel and the data in Fast Channel of a data type specified by the mode, both Channels being of a time slot transmitted from the first station.

Now, the sequence shown in FIG. 3 is described in detail with reference to FIG. 4.

Suppose data is currently transmitted in the primary mode in both directions, namely, from the first station to the second station and the reversed direction. Voice data 1000 is transmitted from the first station to the second station in succession (state 1101), and at the same time, voice data 1010 is transmitted from the second station to the first station in succession.

At this stage, a necessity for the first station to temporarily transmit non-voice data to the second station arises.

The acknowledgement-type mode switching unit 903 of the first station attaches a acknowledgement-type mode switch directive to the non-voice data to be transmitted. The non-voice data with the directive attached, namely non-voice data 1001 is transmitted to the second station in succession (state 1102).

More specifically, the acknowledgement-type mode switching unit 903 sets a bit pattern in Slow Channel which enables the other station to identify the acknowledgement-type mode switch directive, and sets non-voice data 1001 in Fast Channel and transmits the time slot to the second station via transmitting unit 901.

On detecting the acknowledgement-type mode switch directive in the received time slot, acknowledgement-type data dividing unit 904 of the second station judges that the mode has changed (from the primary mode to the secondary mode) and that the data is of a different type from that of the current data, then transfers the received data to non-voice data processing unit 906 and notifies acknowledgement-type mode switching unit 903 of the fact.

The second station transmits voice data 1011 with a acknowledgement directive to the first station to reply that it detected and acknowledged the acknowledgement-type mode switch directive. More specifically, the acknowledgement-type mode switching unit 903, according to the above notification from acknowledgement-type data dividing unit 904, sets a bit pattern in Slow Channel which enables the other station to identify the acknowledgement directive, and sets voice data 1011 in Fast Channel and transmits the time slot to the first station via transmitting unit 901.

On detecting the acknowledgement directive in the received time slot, acknowledgement-type data dividing unit 904 of the first station judges that the reception state of the second station has changed from the primary mode to the secondary mode, then notifies acknowledgement-type mode switching unit 903 of the fact.

On and after receiving the notification, acknowledgement-type mode switching unit 903 of the first station transmits time slots including non-voice data 1002 without a acknowledgement-type mode switch directive to the second station in succession (state 1103).

On and after receiving a time slot including non-voice data 1002 without a acknowledgement-type mode switch directive, the second station judges that the acknowledgement directive has been identified by the first station, and transmits voice data 1012 without a acknowledgement directive.

In this way, the first station succeeds to change the transmission data from voice data to non-voice data by changing the transmission state from 1101 to 1103 by acquiring the acknowledgement from the remote station, namely, the second station.

The first station performs the same sequence of communications when it resumes the transmission of voice data after having completed transmission of all the necessary non-voice data. In this case, however, the reception state of the second station changes from the secondary mode to the primary mode when the second station receives a acknowledgement-type mode switch directive. As a result, the transmission state of the first station returns from 1103 to 1101 through 1104.

As is described above, the conventional communication apparatus achieves the mixed data communications by using the acknowledgement-type mode switch directive and the acknowledgement directive.

However, in such a communication method, the transmitting station should continue to transmit the acknowledgement-type mode switch directive until it receives the acknowledgement directive from the receiving station.

Therefore, a case may occur where though data has been transmitted, only the acknowledgement-type mode switch directive is kept being transmitted in successive time slots. This occurs in case, for example, one or two time slots are enough to newly transmit data which is of a different type from that of the current data.

The above case generates several problems. That is, time slots are wasted or a long pause is created between data transmissions in the same modes since time slots with vacant Fast Channels are kept being transmitted until the other station sends the acknowledgement directive.

The above problems cause much reduction in communications efficiency when the distance between two stations is very long or when a small number of time slots are intermittently but frequently transmitted, for example, in case of a non-voice data transmission with Automatic Repeat reQuest (ARQ) such as High Level Data Link Control procedures (HDLC).

SUMMARY OF THE INVENTION

It is therefore the first object of the present invention to provide a communication apparatus which transmits and receives a plurality types of data with a TDM slot by switching a mode to change the type of the data and switches the mode effectively without reducing the communication efficiency even in a case where a small amount of data, which is of a different type from that of the current data, is transmitted.

The above object is achieved by a communication apparatus for transmitting and receiving a plurality types of data with a TDM slot by changing data from one of the plurality types to another of the plurality types by changing a mode, the communication apparatus comprising: non-acknowledgement-type transmitting means for transmitting the data by changing the mode without obtaining a acknowledgement from a remote station; and non-acknowledgement-type receiving means for receiving the data from the remote station and identifying the type of the data, wherein the non-acknowledgement-type transmitting means comprises: a transmitting unit for transmitting time slot data which includes a control directive and one of first data and second data, wherein the first data is of a type different from a type of the second data; a first judging unit for, during a transmission of the time slot data including the first data by the transmitting unit, detecting a necessity for transmitting the second data to the remote station and judging whether a length of the second data is less than a predetermined value; and a multiplexing unit for inserting the second data and a non-acknowledgement-type mode switch directive into the time slot data and letting the transmitting unit transmit the time slot data by an interrupt if the first judging unit judges that the length of the second data is less than the predetermined value, wherein the non-acknowledgement-type receiving means comprises: a receiving unit for receiving the time slot data from the remote station; a second judging unit for judging whether the received time slot data includes the non-acknowledgement-type mode switch directive; and an identifying unit for identifying the second data included in the received time slot data if the second judging unit judges that the received time slot data includes the non-acknowledgement-type mode switch directive.

With such a construction, when a necessity arises for a transmitting station to transmit the second data during the transmission of the first data, the transmitting station transmits the second data in a required number of time slots.

Accordingly, the present communication apparatus prevents the occurrence of a problem in which time slot data with only a mode switch directive and with vacant Fast Channel is kept being transmitted, achieving an effective use of the time slot.

The communication apparatus may make communications with acknowledgement-type mode switching, which is used in the conventional communication apparatus, as well as communications with non-acknowledgement-type mode switching as described above. This achieves a flexible communication apparatus which dynamically responds to both communications of requiring and not requiring of a high-speed mode switch.

Also, two types of modes may be used by the communication apparatus, and the non-acknowledgement-type mode switch directive may include a bit pattern used for specifying a switch from one of the two types of modes to the other. This reduces the number of bits used in the mode switch directive in each time slot since a smaller number of bits are used for identifying the mode switch directive than a communication in which three or more types of modes are used. Also, this achieves a simple construction of a receiving station since the receiving station has only two types of modes to identify and processes the data according to the identification.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following is a description of the present invention, a communication apparatus, with reference to the drawings.

Figure 5:
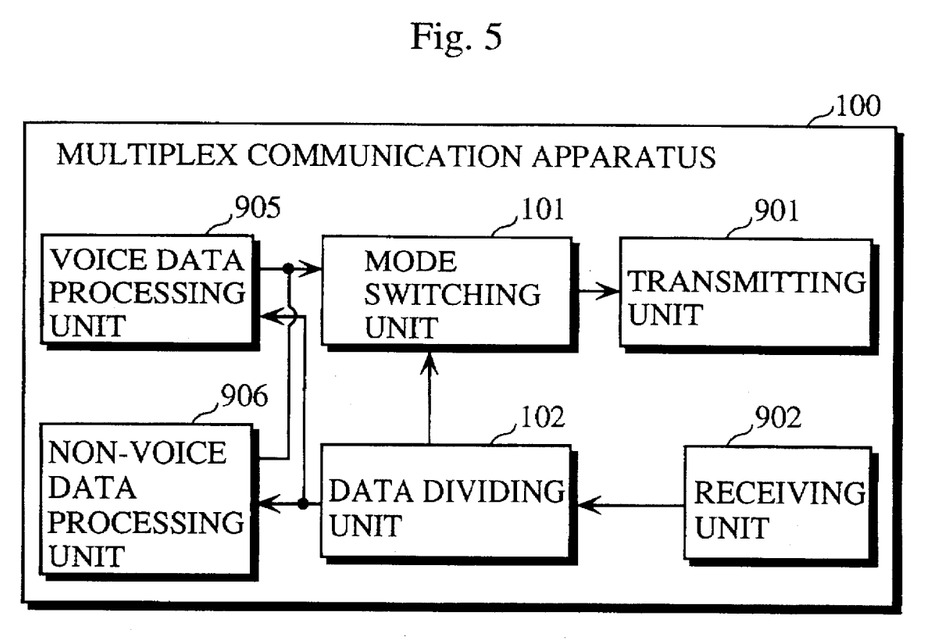
FIG. 5 is a block diagram illustrating the construction of the communication apparatus in the present embodiment of the present invention.

FIG. 5 is a block diagram illustrating the construction of communication apparatus 100 in the present embodiment of the present invention.

Communication apparatus 100 includes transmitting unit 901, receiving unit 902, mode switching unit 101, data dividing unit 102, voice data processing unit 905, and non-voice data processing unit 906. Note that elements with the same numbers as those of the conventional communication apparatus 900 are not explained here since they have the same functions.

Figure 6:
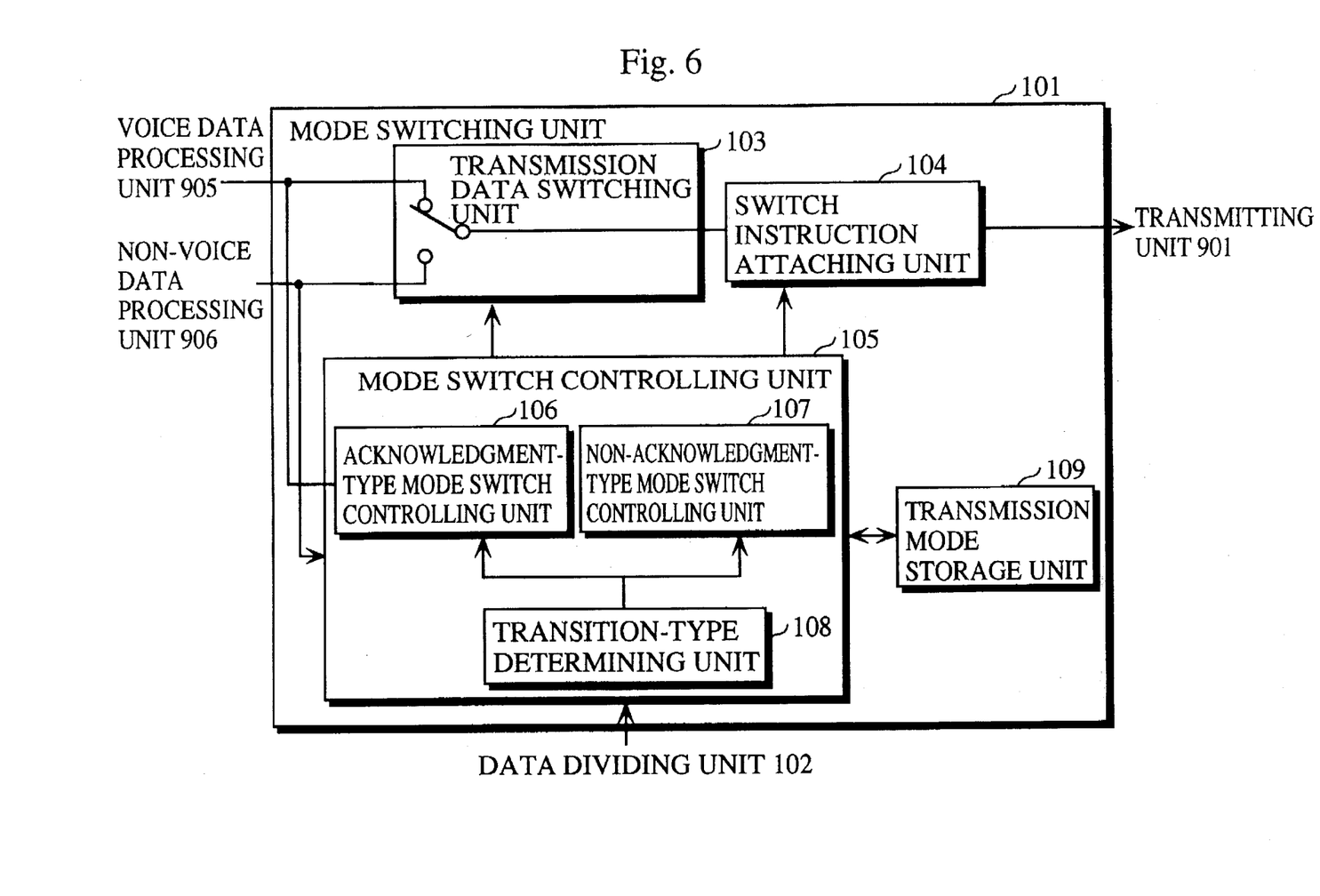
FIG. 6 is a block diagram illustrating the construction of mode switching unit 101 of the communication apparatus in the present embodiment of the present invention.

Mode switching unit 101 manages the transmission state of the local communication apparatus and creates the time slot data according to the type of transmission data. Mode switching unit 101 includes, as shown in FIG. 6, transmission data switching unit 103, switch directive attaching unit 104, mode switch controlling unit 105, and transmission mode storage unit 109.

Transmission data switching unit 103 obtains selectively transmission data included in either of voice data processing unit 905 and non-voice data processing unit 906 according to an instruction from mode switch controlling unit 105, and sends the transmission data to switch directive attaching unit 104.

Switch directive attaching unit 104 creates the time slot data by attaching a acknowledgement-type or non-acknowledgement-type mode switch directive to the data sent from transmission data switching unit 103 according to an instruction from mode switch controlling unit 105, and sends the data to transmitting unit 901. Note that the frames used in the present embodiment have the same construction as those used by the conventional communication apparatus shown in FIG. 2. Accordingly, switch directive attaching unit 104 sets the data sent from transmission data switching unit 103 in Fast Channel in a time slot, and sets a acknowledgement-type or non-acknowledgement-type mode switch directive in Slow Channel according to an instruction from mode switch controlling unit 105.

Here, the acknowledgement-type mode switch indicates a method in which the local station continues to transmit a directive to change the mode until it receives a acknowledgement directive from the remote station. The conventional communication apparatus adopts this method. On the other hand, the non-acknowledgement-type mode switch indicates a method in which the local station transmits a directive for changing transmission mode but does not wait for a acknowledgement directive to reach.

The first bit of Slow Channel indicates whether the Slow Channel is a mode switch directive. If a mode switch directive, the second bit indicates whether the directive is acknowledgement type or non-acknowledgement type.

Mode switch controlling unit 105 manages the transmission state of the local station and controls transmission data switching unit 103 and switch directive attaching unit 104 according to the amount and type of the data and a notification from data dividing unit 102. Mode switch controlling unit 105 includes acknowledgement-type mode switch controlling unit 106, non-acknowledgement-type mode switch controlling unit 107, and transition-type determining unit 108.

Acknowledgement-type mode switch controlling unit 106 has the same function as acknowledgement-type mode switching unit 903 of the conventional communication apparatus, that is, switches the mode by receiving the acknowledgement from the remote station.

Non-acknowledgement-type mode switch controlling unit 107 switches the mode independently of the acknowledgement from the remote station. More specifically, on being activated by transition-type determining unit 108, non-acknowledgement-type mode switch controlling unit 107 instructs transmission data switching unit 103 and switch directive attaching unit 104 to stop the current data transmission temporarily and transmits data of the other type with a non-acknowledgement-type mode switch directive.

Transition-type determining unit 108 activates either of acknowledgement-type mode switch controlling unit 106 and non-acknowledgement-type mode switch controlling unit 107 according to the directives sent from voice data processing unit 905 and non-voice data processing unit 906.

More specifically, transition-type determining unit 108 judges whether the amount of data generated by voice data processing unit 905 and non-voice data processing unit 906 is less than a predetermined value (in this embodiment, the value is equal to an amount of data that can be transmitted by ten time slots, namely, 10 time slots×80 bits=800 bits). If not less, transition-type determining unit 108 activates acknowledgement-type mode switch controlling unit 106; if less, non-acknowledgement-type mode switch controlling unit 107.

Transmission mode storage unit 109 is an area in which the current transmission state of the local station is stored and updated by mode switch controlling unit 105. More specifically, two bits of information is stored in transmission mode storage unit 109 which indicates the current transmission state, namely, any of the four states shown in FIG. 4.

Figure 7:
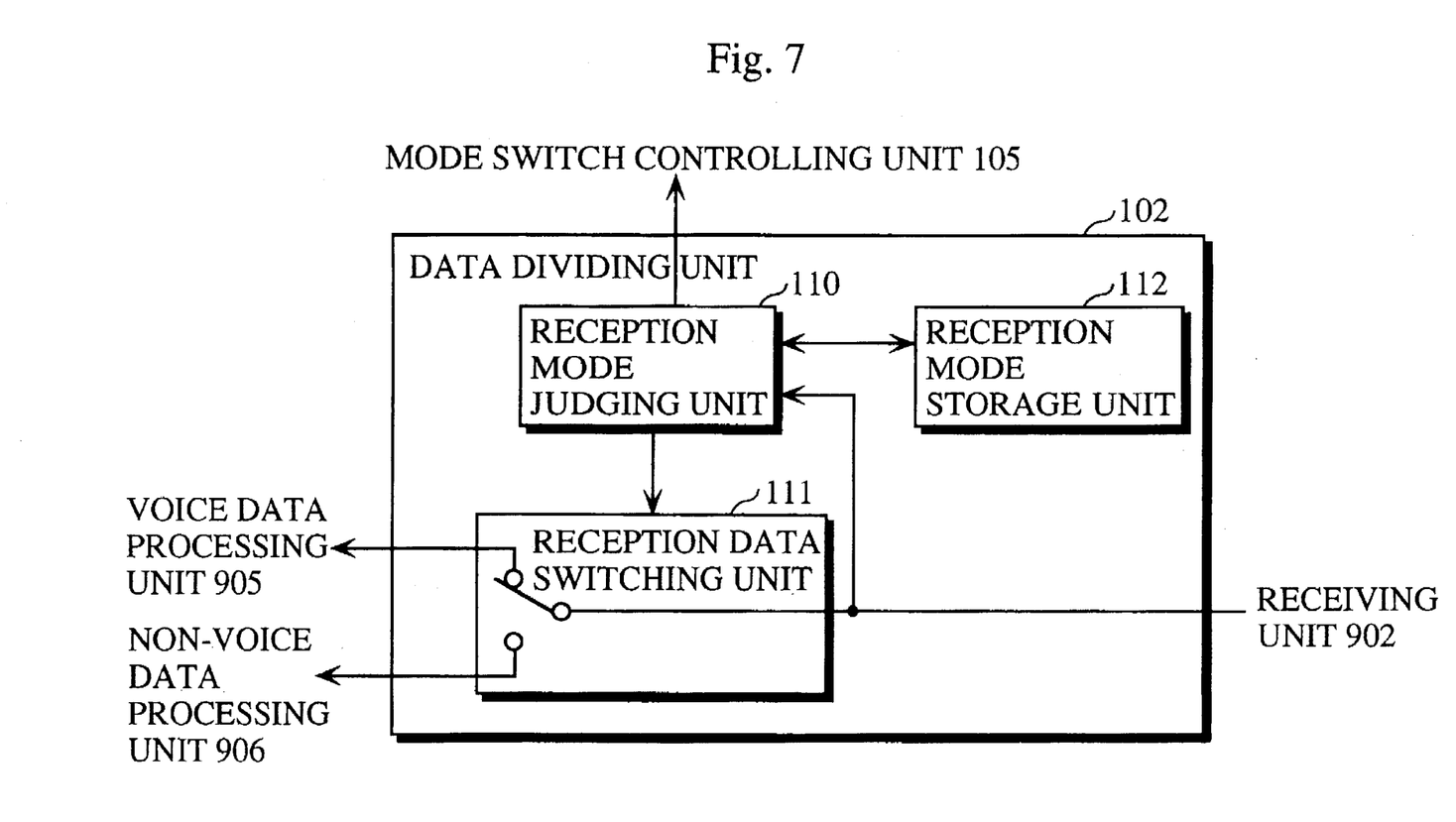
FIG. 7 is a block diagram illustrating the construction of data dividing unit 102 of the communication apparatus in the present embodiment of the present invention.

Data dividing unit 102 manages the reception state of the local station according to the received time slot data, notifies mode switch controlling unit 105 of the fact, and divides the received data. Data dividing unit 102 includes, as shown in FIG. 7, reception mode judging unit 110, reception data switching unit 111, and reception mode storage unit 112.

Reception mode judging unit 110 judges the mode in the data transmission according to the contents of Slow Channel in the, time slot, which is received by receiving unit 902 and separated in time division, and the state stored in reception mode storage unit 112. That is, reception mode judging unit 110 judges whether the received data is voice data or non-voice data, and notifies reception data switching unit 111 of the judgement.

Reception data switching unit 111 sends the received data to either of voice data processing unit 905 and non-voice data processing unit 906 according to the judgement from reception mode judging unit 110.

Reception mode storage unit 112 is an area in which the mode in the current data reception, namely, the current reception state, is stored and updated by reception mode judging unit 110.

Now, the operation of communication apparatus 100 is described with reference to FIGS. 8–10.

Figure 8:
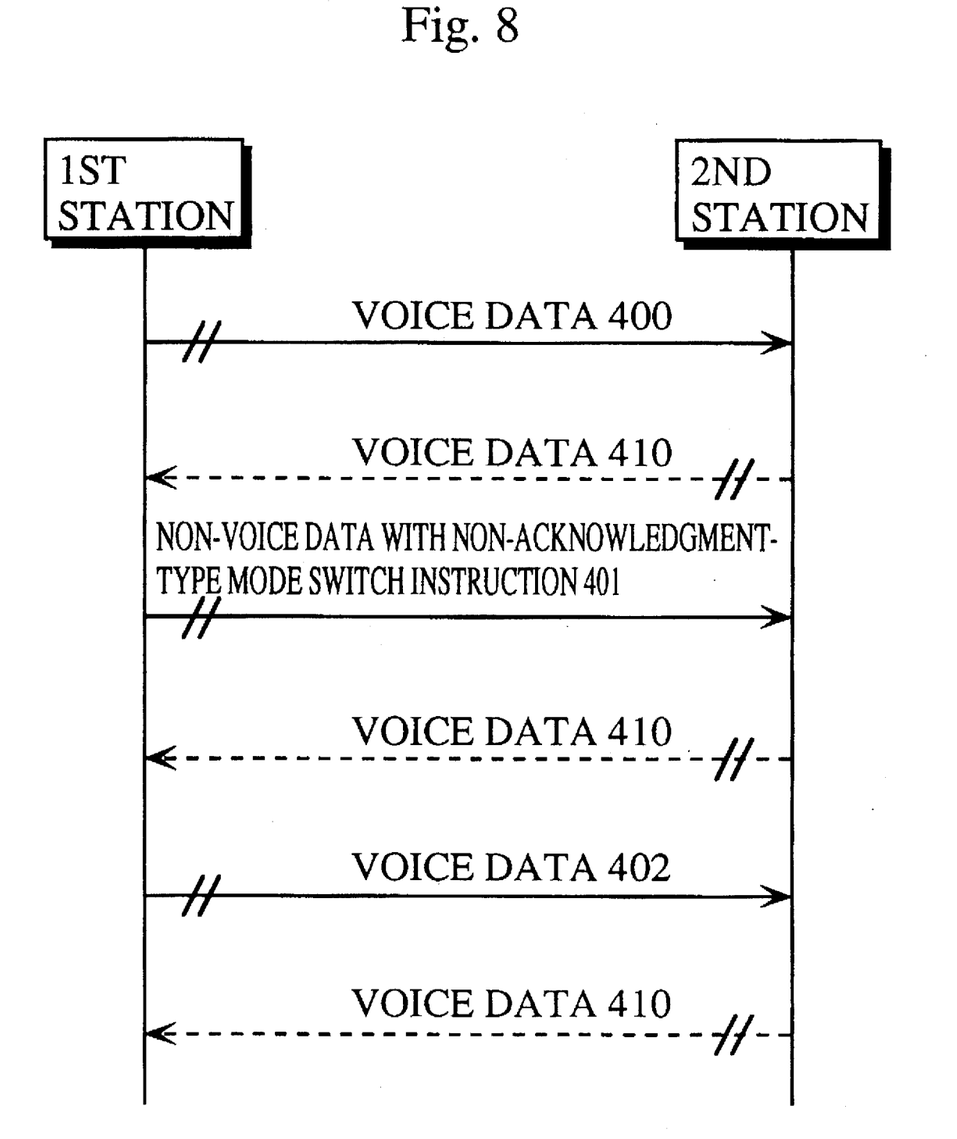
FIG. 8 shows a sequence of the mixed data communications by communication apparatuses in the present embodiment of the present invention.

FIG. 8 shows a sequence of the mixed data communications performed by the communication apparatuses of the present embodiment.

In FIG. 8, the first station and the second station of the present embodiment performs the same mixed data communications as the conventional ones shown in FIG. 3. That is, the first station transmits voice data to the second station, stops the transmission temporarily, transmits non-voice data, and re-transmits voice data after having transmitted the non-voice data.

Figure 9:
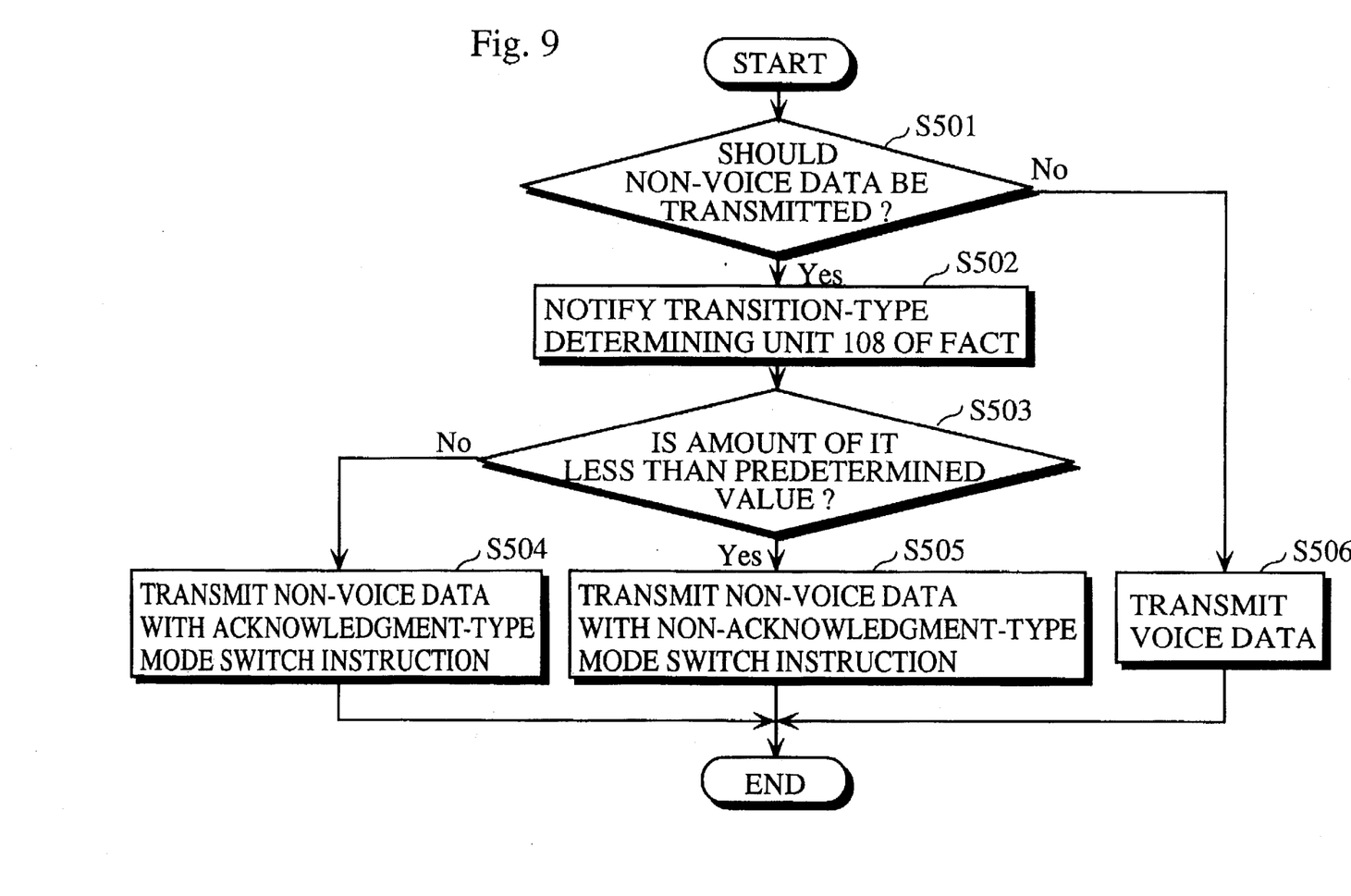
FIG. 9 is a flowchart showing the procedure by mode switching unit 101 of the communication apparatus in the present embodiment of the present invention.
Figure 10:
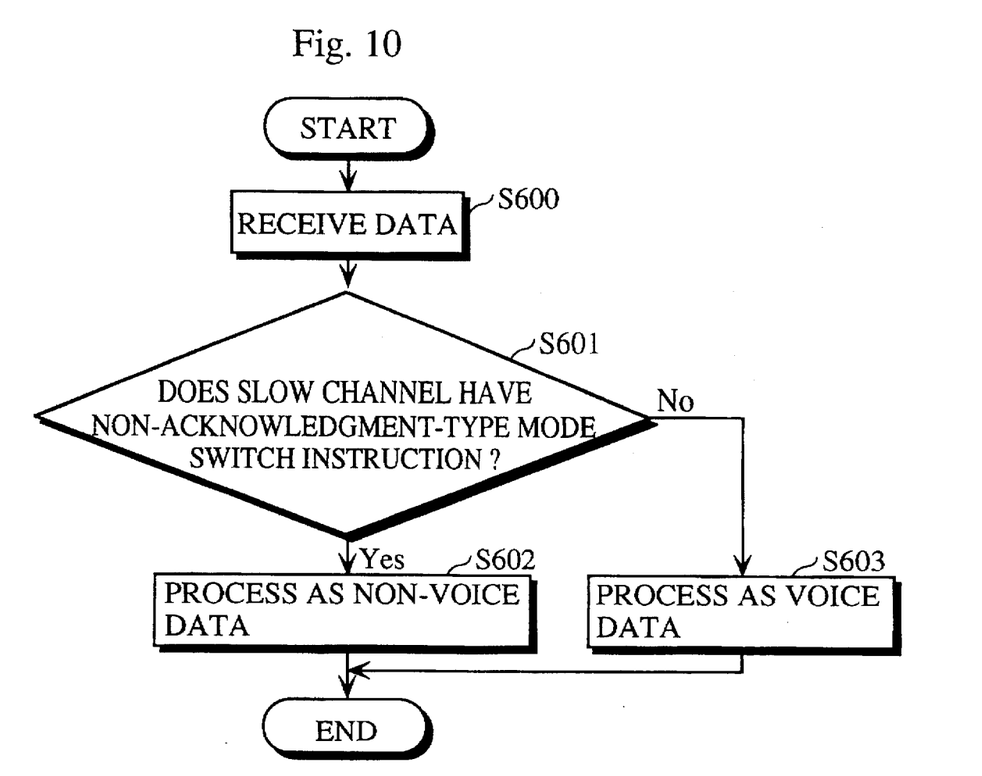
FIG. 10 is a flowchart showing the procedure by data dividing unit 102 of the communication apparatus in the present embodiment of the present invention.

FIGS. 9 and 10 are flowcharts showing the procedures of the sequence of the communications shown in FIG. 8.

Note that it is similarly supposed that a connection is established before the data is transmitted and that the notation in FIG. 8 is the same as that in FIG. 3.

Attention is focused on the first station in the following description.

Suppose data is currently transmitted in the primary mode in both directions, namely, from the first station to the second station and the reversed direction. Voice data 400 is transmitted from the first station to the second station in succession (steps S501 and S506), and at the same time, voice data 410 is transmitted from the second station to the first station in succession.

At this stage, a necessity arises for the first station to temporarily transmit non-voice data to the second station.

That is, on judging that the first station should transmit non-voice data (step S501), non-voice data processing unit 906 notifies transition-type determining unit 108 of the fact (step S502).

On receiving the notification, transition-type determining unit 108 judges whether the amount of the non-voice data to be transmitted is less than a predetermined value, namely 800 bits (step S503).

If less (e.g., amount of the non-voice data is 100 bits), transition-type determining unit 108 activates non-acknowledgement type mode switch controlling unit 107.

Non-acknowledgement type mode switch controlling unit 107 controls transmission data switching unit 103 and switch directive attaching unit 104 so that the non-voice data is transmitted to the second station together with a non-acknowledgement-type mode switch directive.

After the above process, the 100 bits of the non-voice data is treated as non-voice data with acknowledgement-type mode switch directive 401. The data is then divided and included in Fast Channels of two time slots to be transmitted to the second station via transmitting unit 901 (step S505). Slow Channels of the two time slots each include non-acknowledgement-type mode switch directives.

On the other hand, on judging that the amount of the non-voice data is not less than a predetermined value, transition-type determining unit 108 activates acknowledgement type mode switch controlling unit 106 (step S504). The operation of this unit is not described here since it operates the same as the conventional one and the same processes follow as those shown in FIG. 3.

After completing the transmission of non-voice data 401, non-acknowledgement type mode switch controlling unit 107 controls transmission data switching unit 103 and switch directive attaching unit 104 so that the transmission of voice data 400 is resumed. The voice data is transmitted again as 402 in time slots with the same construction as those for voice data 400, that is, Fast Channel includes voice data and Slow Channel has no directive for switching the mode (steps S501 and S506).

Now, in the following description, attention is focused on the second station having received data from the first station.

The second station receives voice data 400 which is transmitted from the first station with the primary mode (step S600). At this stage, reception mode storage unit 112 stores information indicating that the second station is currently receiving data in the primary mode.

Reception mode judging unit 110 judges for each time slot whether Slow Channel includes an acknowledgement-type mode switch directive or a non-acknowledgement-type mode switch directive (step S601).

On receiving non-voice data with non-acknowledgement-type mode switch directive 401 from the first station, reception mode judging unit 110 of the second station detects the non-acknowledgement-type mode switch directive in Slow Channel of the received time slot. Then, reception mode judging unit 110 judges the reception mode to be the secondary mode by referring to a value stored in reception mode storage unit 112, and activates reception data switching unit 111 (step S602). As a result, the 100 bits of non-voice data 401 transmitted in two time slots from the first station is sent to non-voice data processing unit 906 via reception data switching unit 111.

After the above process, on receiving voice data 402 from the first station, reception mode judging unit 110 of the second station detects no non-acknowledgement-type mode switch directive in Slow Channel of the received time slot. Then, reception mode judging unit 110 judges the reception mode to be the primary mode by referring to a value stored in reception mode storage unit 112, and activates reception data switching unit 111 (step S603). As a result, voice data 402 is sent to voice data processing unit 905 via reception data switching unit 111.

As is understood from the above description, small amount of data (100 bits of non-voice data) is transmitted in the number of time slots required to transmit the data (two time slots). That is, the present communication apparatus does not wastefully transmit time slots that include only mode switch directives in Slow Channels and do not include data in Fast Channels.

The above characteristics are described with reference to FIG. 11 which is a diagram of states of a communication apparatus.

Figure 11:
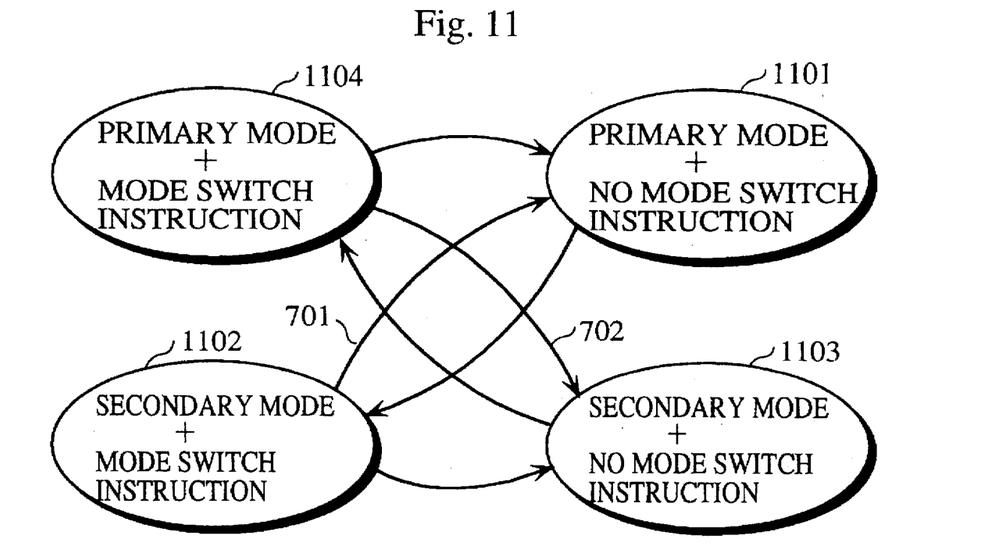
FIG. 11 is a diagram of states of the communication apparatus in the present embodiment of the present invention.

FIG. 11 is different from FIG. 4 in that it additionally has two routes 701 and 702.

The conventional communication apparatus cannot return to the primary mode unless it goes through states 1103 and 1104 after it has changed the mode from the primary (state 1101) to the secondary (state 1102). On the other hand, the present communication apparatus can return to the primary mode without going through states 1103 and 1104.

The conventional local station should keep transmitting acknowledgement-type mode switch directives until it receives a acknowledgement directive from the remote station when the state changes from 1102 to 1103 or from 1104 to 1101. However, this procedure is not necessary for the present communication apparatus. As a result, wasteful transmissions of time slots are prevented in a case where a small amount of data is temporarily transmitted in a different mode. This prevents the wasteful consumption of time slots, providing effective use of time slots.

Also, data transmission efficiency is improved since the transmission mode is switched at high speed. Specifically, the redundancy of the backward channel is greatly reduced in a case where the mode is switched frequently, for example, in case of a non-voice data transmission with ARQ such as HDLC.

Note that the present communication apparatus transmits the transmission data of the second type in the same way as the conventional apparatus, namely with acknowledgement-type mode switching, if the transmission data of the second type is not less than a predetermined value, for example, in a case of a file transmission.

In this way, the present communication apparatus transmits the second type transmission data with non-acknowledgement-type mode switching if the data is small, with acknowledgement-type mode switching if large. The reason is described below.

Transmitting a large amount of data with non-acknowledgement-type mode switching causes Slow Channel not to be used for other purposes for a long period since the Slow Channels of the time slots transmitted in succession are occupied with non-acknowledgement-type mode switch directives. Compared to this method, data transmission with acknowledgement-type mode switching frees Slow Channel for other purposes since the local station does not need to transmit a acknowledgement-type mode switch directive once it receives a acknowledgement from the remote station, as is described in the conventional technique.

Accordingly, the present communication apparatus prevents the occurrence of an overhead by the mode switching by transmitting a small amount of the second type data with non-acknowledgement-type mode switching, and effectively uses Slow Channel by transmitting a large amount of the second type data with acknowledgement-type mode switching.

Described above is an embodiment of the communication apparatus of the present invention. However, the present invention is not limited to the forms disclosed in the above embodiment. The following are examples of other forms available in the embodiment.

(1) In the present embodiment, a connection is established in the originating connection before the data is transmitted so that the voice data is transmitted in the primary mode and non-voice data in the secondary mode. However, another connection may be established instead.

For example, a connection may be established in the originating connection before the data is transmitted so that non-voice data with high priority is transmitted in the primary mode and non-voice data with low priority in the secondary mode. Also, each mode may be set for other kinds of data, such as character data and image data.

(2) In the present embodiment, a directive is represented by two bits in Slow Channel. However, a directive may be represented by another bit pattern.

For example, the third bit of Slow Channel may indicate a switch from the primary mode to the secondary mode or vice versa. This achieves a more secure mode switch since it indicates not only a mere mode switch but also both the mode to be switched and the replacing mode.

(3) In the present embodiment, two modes are provided. However, three or more modes may be provided instead.

For example, four modes may be specified by using the third and fourth bits of Slow Channel. This enables transmission/reception of multimedia data, which includes voice data, image data, character data, etc., in one TDM slot by means of the mode switching.

(4) In general, a mobile communication system is made up of a plurality of mobile stations and a plurality of base stations. These mobile stations perform wireless communications with these base stations, and these base stations communicate with each other via a wired network such as Public Switched Telephone Network (PSTN) and Integrated Services Digital Network (ISDN). It is needless to say that the communication apparatus of the present embodiment can be applied to such a mobile station and a base station.

For example, the communication apparatus of the present embodiment functions as a base station in a mobile communication system if voice data processing unit 905 and non-voice data processing unit 906 are equipped with PSTN or ISDN interfaces.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A communication apparatus for transmitting and receiving a plurality types of data with a TDM slot by changing data from one of the plurality types to another of the plurality types by changing a mode, the communication apparatus comprising:

non-acknowledgement-type transmitting means for transmitting data by changing the mode without obtaining a acknowledgement from a remote station; and non-acknowledgement-type receiving means for receiving the data from the remote station and identifying the type of the data, wherein the non-acknowledgement-type transmitting means comprises:

a transmitting unit for transmitting time slot data which includes a control directive and one of first data and second data, wherein the first data is of a type different from a type of the second data;

a first judging unit for, during a transmission of the time slot data including the first data by the transmitting unit, detecting a necessity for transmitting the second data to the remote station and judging whether a length of the second data is less than a predetermined value; and a multiplexing unit for inserting the second data and a non-acknowledgement-type mode switch directive into the time slot data and letting the transmitting unit transmit the time slot data by an interrupt if the first judging unit judges that the length of the second data is less than the predetermined value, wherein the non-acknowledgement-type receiving means comprises:

a receiving unit for receiving the time slot data from the remote station;

a second judging unit for judging whether the received time slot data includes the non-acknowledgement-type mode switch directive; and an identifying unit for identifying the second data included in the received time slot data if the second judging unit judges that the received time slot data includes the non-acknowledgement-type mode switch directive.

2. The communication apparatus of claim 1, further comprising:

acknowledgement-type transmitting means for transmitting the data by changing the mode by obtaining a acknowledgement from the remote station; and acknowledgement-type receiving means for receiving the data from the remote station and identifying the type of the data.

3. The communication apparatus of claim 2, wherein two types of modes are used by the communication apparatus.

4. The communication apparatus of claim 3, wherein the non-acknowledgement-type mode switch directive includes a bit pattern used for specifying a switch from one of the two types of modes to the other of the two types of modes.

5. The communication apparatus of claim 4, wherein one of the two types of modes indicates that the data is voice data, and the other of the two types of modes indicates that the data is non-voice data.

6. The communication apparatus of claim 3, wherein one of the two types of modes indicates that the data is voice data, and the other of the two types of modes indicates that the data is non-voice data.

* * * * *